United States Patent
Huang et al.

(10) Patent No.: US 9,762,602 B2
(45) Date of Patent: Sep. 12, 2017

(54) GENERATING ROW-BASED AND COLUMN-BASED CHUNKS

(71) Applicant: HEWLETT-PACKARD DEVELOPMENT COMPANY, L.P., Houston, TX (US)

(72) Inventors: Wei Huang, Fremont, CA (US); Yizheng Zhou, Cupertino, CA (US); Bin Yu, San Ramon, CA (US); Wenting Tang, Sunnyvale, CA (US); Christian F. Beedgen, Cupertino, CA (US)

(73) Assignee: EntIT Software LLC, Sunnyvale, CA (US)

( * ) Notice: Subject to any disclaimer, the term of this patent is extended or adjusted under 35 U.S.C. 154(b) by 30 days.

(21) Appl. No.: 14/846,555

(22) Filed: Sep. 4, 2015

(65) Prior Publication Data
US 2015/0381647 A1    Dec. 31, 2015

Related U.S. Application Data

(60) Division of application No. 12/554,541, filed on Sep. 4, 2009, now Pat. No. 9,166,989, which is a
(Continued)

(51) Int. Cl.
*G06F 7/00*    (2006.01)
*G06F 17/00*    (2006.01)
(Continued)

(52) U.S. Cl.
CPC .... *H04L 63/1425* (2013.01); *G06F 17/30595* (2013.01); *G06F 21/552* (2013.01);
(Continued)

(58) Field of Classification Search
CPC .. G06F 17/30; G06F 21/552; G06F 17/30595; G06F 11/3476; G06F 2221/034;
(Continued)

(56) References Cited

U.S. PATENT DOCUMENTS 5,537,541 A    7/1996    Wibecan
5,740,468 A    4/1998    Hirose
(Continued)

FOREIGN PATENT DOCUMENTS

CN    1959676 A    5/2007
JP    08106408 A    4/1996
(Continued)

OTHER PUBLICATIONS

Office Action, EP Application No. 07870034.1, Date: Feb. 5, 2016, pp. 1-4, EPO.
(Continued)

*Primary Examiner* — Azam Cheema

(57) ABSTRACT

In some examples, a set of events is received. A row-based chunk includes the set of events and metadata about the set of events is generated, and a column-based chunk that includes metadata about the set of events and, for each event in the set of events, a value of a first field of the multiple fields. The metadata about the set of events includes at least one of a minimum value or a maximum value of the first field over the events in the set of events.

15 Claims, 6 Drawing Sheets

Related U.S. Application Data continuation-in-part of application No. 11/966,078, filed on Dec. 28, 2007, now Pat. No. 9,031,916.

(60) Provisional application No. 61/094,762, filed on Sep. 5, 2008, provisional application No. 60/882,289, filed on Dec. 28, 2006.

(51) Int. Cl.

| | | |
|---|---|---|
| H04L 29/06 | (2006.01) | |
| G06F 21/55 | (2013.01) | |
| G06F 17/30 | (2006.01) | |
| G06F 11/34 | (2006.01) | |

(52) U.S. Cl.
CPC ...... *H04L 63/1408* (2013.01); *G06F 11/3476* (2013.01); *G06F 2201/86* (2013.01); *G06F 2221/034* (2013.01)

(58) Field of Classification Search
CPC ............. G06F 2201/86; H04L 63/1425; H04L 63/1408
See application file for complete search history.

(56) References Cited

U.S. PATENT DOCUMENTS

| | | | |
|---|---|---|---|
| 5,787,249 | A | 7/1998 | Badovinatz et al. |
| 5,964,857 | A | 10/1999 | Srinivasan et al. |
| 5,999,929 | A | 12/1999 | Goodman |
| 6,038,564 | A | 3/2000 | Sameshima et al. |
| 6,067,565 | A | 5/2000 | Horvitz |
| 6,078,930 | A | 6/2000 | William et al. |
| 6,363,372 | B1 | 3/2002 | Lichterman |
| 6,516,350 | B1 | 2/2003 | Lumelsky et al. |
| 6,601,101 | B1 | 7/2003 | Lee et al. |
| 6,606,645 | B1 | 8/2003 | Cohen et al. |
| 6,807,572 | B1 | 10/2004 | Yu |
| 6,826,613 | B1 | 11/2004 | Wang et al. |
| 6,959,327 | B1 | 10/2005 | Vogl et al. |
| 6,996,615 | B1 | 2/2006 | McGuire |
| 7,039,773 | B2 | 5/2006 | Hu et al. |
| 7,152,242 | B2 | 12/2006 | Douglas |
| 7,219,239 | B1 | 5/2007 | Njemanze et al. |
| 7,260,844 | B1 | 8/2007 | Tidwell |
| 7,333,999 | B1 | 2/2008 | Njemanze |
| 7,376,969 | B1 | 5/2008 | Njemanze et al. |
| 7,437,359 | B2 | 10/2008 | Aguilar-Macias |
| 7,493,776 | B2 | 2/2009 | Lim |
| 7,509,677 | B2 | 3/2009 | Saurabh |
| 7,516,114 | B2 * | 4/2009 | Dieberger ............. G06F 11/324 |
| 7,565,696 | B1 | 7/2009 | Njemanze |
| 7,607,169 | B1 | 10/2009 | Njemanze |
| 7,650,638 | B1 | 1/2010 | Njemanze |
| 7,653,836 | B1 | 1/2010 | Chatterjee et al. |
| 7,769,728 | B2 | 8/2010 | Ivie |
| 7,774,304 | B2 | 8/2010 | Banzon et al. |
| 7,788,722 | B1 | 8/2010 | Njemanze |
| 7,809,131 | B1 | 10/2010 | Njemanze |
| 8,176,527 | B1 | 5/2012 | Njemanze |
| 8,528,077 | B1 | 9/2013 | Tidwell |
| 9,031,916 | B2 | 5/2015 | Huang |
| 9,100,422 | B1 | 8/2015 | Tidwell |
| 2002/0073232 | A1 | 6/2002 | Hong et al. |
| 2002/0172163 | A1 | 11/2002 | Chen et al. |
| 2003/0043815 | A1 | 3/2003 | Tinsley et al. |
| 2003/0084140 | A1 | 5/2003 | Takeuchi et al. |
| 2003/0135593 | A1 | 7/2003 | Lee et al. |
| 2003/0217033 | A1 | 11/2003 | Sandler et al. |
| 2003/0236882 | A1 | 12/2003 | Yan et al. |
| 2004/0162901 | A1 | 8/2004 | Mangipudi et al. |
| 2004/0221116 | A1 | 11/2004 | Hu et al. |
| 2005/0114321 | A1 | 5/2005 | DeStefano et al. |
| 2005/0138471 | A1 | 6/2005 | Okbay |
| 2005/0268068 | A1 | 12/2005 | Ignatius et al. |
| 2006/0036660 | A1 | 2/2006 | Lynn |
| 2007/0061544 | A1 * | 3/2007 | Uppala ............. G06F 17/30315 711/173 |
| 2007/0143564 | A1 * | 6/2007 | Uppala ............. G06F 17/30575 711/173 |
| 2008/0059412 | A1 | 3/2008 | Tarin |
| 2008/0146193 | A1 * | 6/2008 | Bentley ................... G06F 21/34 455/411 |
| 2008/0162592 | A1 | 7/2008 | Huang et al. |
| 2009/0012957 | A1 * | 1/2009 | Villaret ..................... G06F 7/02 |

FOREIGN PATENT DOCUMENTS

| | | |
|---|---|---|
| JP | 11327966 A | 11/1999 |
| JP | 2001229051 A | 8/2001 |
| JP | 2003141075 A | 5/2003 |
| RU | 2161329 | 12/2000 |

OTHER PUBLICATIONS

Office Action, EP Application No. 09812310.2, Date: Aug. 19, 2016, pp. 1-4, EPO.

Aron, M. et al., "Scalable Content-Aware Request Distribution in Cluster-Based Network Servers," Proceedings of the 2000 Annual USENIX technical Conference, No. LABOS-CONF-2005-025, 2000, 15 pages.

Frannfors, M., "Log Query Server—A Design Proposal," Master's Thesis, Lulea University of Technology, Apr. 11, 2006, [Retrieved on Jun. 6, 2008] Retrieved from the internet <URL: http://epubl.luth.se/1402-1617/2006/173/LTU-EX-06173-SE.pdf> (66 pages).

Gowda, A., "Centralized Syslog Server Using syslog-NG with web Interface using php-syslog-ng," Dec. 19, 2006, [Retrieved Jan. 18, 2011] Retrieved from the Internet <URL:http://errorforum.com/linux-unix-error/2302-centralized-syslog-server-using-syslog-ng-web-interface-using-php-syslog-ng.html> (7 pages).

Hugh Njemanze et al., U.S. Appl. No. 10/308,584, filed Dec. 2, 2002, Method for Aggregating Events To Be Reported By Software Agent, 39 pages.

Hugh Njemanze et al., U.S. Appl. No. 10/308,941, filed Dec. 2, 2002, Event Normalization With Software Agent of Network Security System, 82 pages.

Hugh Njemanze et al., U.S. Appl. No. 10/713,471, filed Nov. 14, 2003, Method and System For Management of Events in a Network Security System, 35 pages.

Intellectual Property Office of Singapore Written Opinion and Search Report, Singapore Patent Application No. 2009-03202-0, Sep. 30, 2010, 18 pages.

Kent, K., et al., "Guide to Computer Security Log Management, Recommendations of the National Institute of Standards and Technology," National Institute of Standards and Technology (NIST), Special Publication 800-92, Sep. 2006, [online] [Retrieved on Jun. 6, 2008] Retrieved from the internet <URL: http://csrc.nist.gov/publications/nistpubs/800-92/SP800-92.pdf> (72 pages).

Kyle Loudon: "Implementation and Analysis of Linked Lists", In: "Mastering Algorithms with C", 5 5 Aug. 1999, O'Reilly Media Inc, XP55025744.

Pai, V.S. et al., "Locality-Aware Request Distribution in Cluster-Based Network Servers," ACM Sigplan Notices, vol. 33, No. 11, ACM Oct. 1998, pp. 205-216.

PCT International Preliminary Report on Patentability, PCT Application No. PCT/US2009/056090, Sep. 30, 2010, 7 pages.

PCT International Search Report and Written Opinion, PCT/US07/89027, Jun. 26, 2008, 7 Pages.

PCT International Search Report and Written Opinion, PCT/US2009/056090, Oct. 15, 2009, 10 Pages.

Richard T Watson: "Data structures", Data Management: Databases and Organizations, Fifth Edition, Aug. 26, 2005, XP55025698 (18 pages).

Russian Office Action, Russian Patent Application No. 2009-128959, Sep. 1, 2010, 7 pages.

S K Singh: "Indexing" In: "Database Systems: Concepts, Design and Applications", Jan. 1, 2006, Pearson Edication India, XP55025697 (8 pages).

(56) References Cited

OTHER PUBLICATIONS

Shijie Wang, U.S. Appl. No. 10/839,563, filed May 4, 2004, Partitioned Event Database In A Network Security System, 24 pages.
SIPOPRC, Corresponding Appl. No. CN200980144159.8, filed Sep. 4, 2009, CN Search Report dated Jul. 11, 2013.
Spatscheck, O. et al., "Optimizing TCP Forwarder Performance," IEEE/ACM Transactions on Networking (TON) 8.2 (2000), pp. 146-157.
Translation of Office Action received in related JP Application No. P2009-544284, mailed Nov. 27, 2012, pp. 4.

\* cited by examiner

GENERATING ROW-BASED AND COLUMN-BASED CHUNKS

CROSS-REFERENCE TO RELATED APPLICATIONS

This application is a divisional of Ser. No. 12/554,541, filed Sep. 4, 2009, U.S. Pat. No. 9,166,989, which claims the benefit of U.S. Provisional Application No. 61/094,762, filed Sep. 5, 2008, and is a continuation-in-part of U.S. application Ser. No. 11/966,078, filed Dec. 28, 2007, U.S. Pat. No. 9,031,916, which claims the benefit of U.S. Provisional Application No. 60/882,289, filed Dec. 28, 2006, all of which are hereby incorporated by reference herein in their entirety.

TECHNICAL FIELD

This invention pertains in general to security information/event management (SIM or SIEM) and in particular to storing security information/events efficiently while supporting querying.

BACKGROUND

The field of security information/event management (SIM or SIEM) is generally concerned with 1) collecting data from networks and networked devices that reflects network activity and/or operation of the devices and 2) analyzing the data to enhance security. For example, the data can be analyzed to identify an attack on the network or a networked device and determine which user or machine is responsible. If the attack is ongoing, a countermeasure can be performed to thwart the attack or mitigate the damage caused by the attack. The data that is collected usually originates in a message (such as an event, alert, or alarm) or an entry in a log file, which is generated by a networked device. Exemplary networked devices include firewalls, intrusion detection systems, and servers.

Each message or log file entry ("event") is stored for future use. Stored events can be organized in a variety of ways. Each organizational method has its own advantages and disadvantages when it comes to writing event data, searching event data, and deleting event data.

Consider the following scenario: Each event includes an attribute called event receipt time. Since the value of the event receipt time attribute is frequently used for searching, store events based on their event receipt times. For example, create one file for each minute of the day. In order to store an event, determine that event's event receipt time. Append the event to the file that corresponds to that minute of event receipt time.

When subsequent events arrive, their event receipt times will always increase monotonically. This means that writing the subsequent event data will require only append operations. No seeking of the storage medium is necessary. This makes for good efficiency in writing the event data. In order to search the event data based on event receipt times, once the first event has been identified, the subsequent events are available by reading the storage medium in order. Again, no seeking is necessary. This makes for good efficiency in searching the event data based on event receipt time. In order to delete the oldest event data, the oldest files are deleted. If the oldest file is always deleted first, then the storage medium will not become fragmented. This makes for good efficiency in deleting the event data.

The problem with this approach is that searching the event data based on any attribute other than the event receipt time is very time consuming. For example, assume that each event also includes an attribute that indicates the device or application that generated the event ("event source"). In order to search the event data for events that indicate a particular event source (i.e., events that include a particular value for the event source attribute), the entire storage medium will have to be reviewed. This is very inefficient.

What is needed is a way to store security information/events efficiently while supporting querying for different event attributes.

SUMMARY

A logging system stores security information/events efficiently while supporting querying for different event attributes. The logging system can be used in conjunction with a security information/event management (SIEM) system. Log data, which can be generated by various sources (including devices and applications), can be in any format. Log data is comprised of one or more data instances called "events." An event can be, for example, an entry in a log file, an entry in a syslog server, an alert, an alarm, a network packet, an email, or a notification page. In general, an event is generated once and does not change afterwards.

In one embodiment, the logging system includes an event receiver, a storage manager, and a communication mechanism. The event receiver receives log data, processes the log data, and outputs a column-based data "chunk." The event receiver includes a control system, a set of buffers, and a metadata structure. The control system controls operation of the event receiver. The set of buffers stores one or more events. If different events include the same types of fields, then the events can be organized in a table. Each row of the table would represent a different event, and each column of the table would represent a different field. Each buffer is associated with a particular field and includes values from that field ("attributes") from one or more events. The metadata structure stores metadata about the contents of the set of buffers. In one embodiment, the metadata includes a unique identifier associated with the event receiver, the number of events in the set of buffers, and, for each of one or more "fields of interest," a minimum value and a maximum value that reflect the range of values of that field over all of the events in the set of buffers. The metadata structure acts as a search index when querying event data.

The storage manager receives column-based data chunks and stores them so that they can be queried. The storage manager includes a control system, a datafiles table, a chunks table, and one or more datafiles. The control system controls operation of the storage manager. The datafiles table stores information about the one or more datafiles. In one embodiment, this information includes, for each datafile, a unique identifier associated with the datafile and the location of the datafile. The chunks table stores information about the one or more column-based chunks that are stored in the storage manager (specifically, stored in the one or more datafiles). In one embodiment, this information includes, for each column-based chunk, the metadata stored in the chunk and the location of the chunk. A datafile stores multiple chunks. The communication mechanism communicatively couples the event receiver and the storage manager.

The event receiver and the storage manager jointly perform a method for storing log data. Before the method begins, the set of buffers and the metadata structure are initialized. The event receiver receives log data. The event receiver control system separates the log data into one or more events and determines when each event was received by the event receiver. The control system stores in the set of buffers the field values of the events and, for each event, a time/date stamp that reflects when the event was received. The control system also updates the metadata structure. At some point in time, the control system generates column-based data chunks based on the metadata structure and the contents of the set of buffers (one column-based chunk for each buffer). In one embodiment, a column-based chunk includes the metadata structure and a compressed version of the contents of the buffer. The set of buffers and the metadata structure are re-initialized, thereby flushing the set of buffers. The control system sends the column-based chunks to the storage manager. The storage manager receives the chunks, stores the chunks in a datafile, and updates the chunks table.

The storage manager performs a method for reclaiming storage. The oldest datafile associated with a particular retention policy is identified. Information regarding all of the column-based chunks contained in the identified datafile is removed from the chunks table. The entry in the datafiles tables that represents the identified datafile is deleted. A new entry is created in the datafiles table. The newly reclaimed datafile is added to the list of available pre-allocated datafiles and is ready to receive new chunks.

After a column-based chunk has been stored in a datafile, the field values within the chunk can be queried. A query is represented as an expression that can be evaluated against an event. The expression includes one or more search terms. A search term concerns the contents of an event, specifically, a particular field and the value of that field. In order to perform a query, data chunks are first filtered based on "field of interest" information (as stored in a chunk's metadata). The remaining chunks are then filtered based on field values (as stored in a chunk's "payload"). Finally, the events that satisfy the query are assembled.

Although the chunks just described were column-based, there is no reason why chunks cannot be row-based. U.S. application Ser. No. 11/966,078 ("the '078 application") describes storing event data using row-based chunks. A third type of event storage uses both row-based chunks and column-based chunks. This type of event storage stores an event twice—once using a row-based chunk and once using one or more column-based chunks. For example, a set of events would be stored as one row-based chunk. The field values of those events would also be stored as column-based chunks (one column-based chunk for each field).

Figure 1:
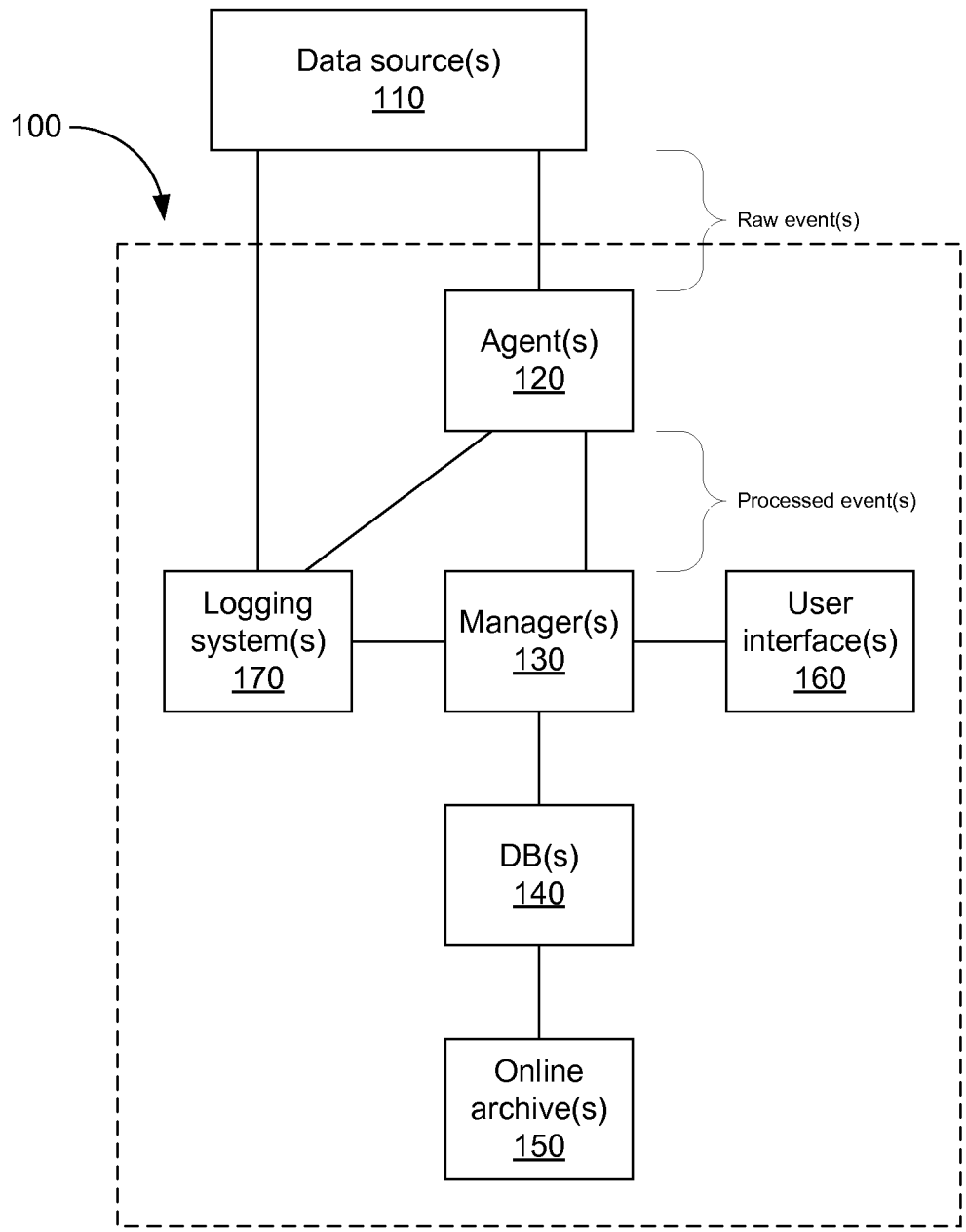
FIG. 1 is a block diagram illustrating an environment having a security information/event management system, according to one embodiment.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Described herein is a computer-based system for collecting data from disparate devices across a computer network, normalizing the data to a common schema, and consolidating the normalized data. The data ("events") can then be monitored, analyzed, and used for investigation and remediation in a centralized view. Events can be cross-correlated with rules to create meta-events. Correlation includes, for example, discovering the relationships between events, inferring the significance of those relationships (e.g., by generating meta-events), prioritizing the events and meta-events, and providing a framework for taking action. The system (one embodiment of which is manifest as computer software) enables aggregation, correlation, detection, and investigative tracking of suspicious network activities. The system also supports response management, ad-hoc query resolution, reporting and replay for forensic analysis, and graphical visualization of network threats and activity.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, machine readable instructions, which, when executed by one or more computer processors/systems, instruct the processors/systems to perform the designated actions. Such computer software may be resident in one or more machine readable storage media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

1. Security Information/Event Management (SIEM) System Architecture

FIG. 1 is a block diagram illustrating an environment having a security information/event management system, according to one embodiment. FIG. 1 includes a security information/event management (SIEM) system 100 and one or more data sources 110. A data source 110 is a network node, which can be a device or a software application. Exemplary data sources 110 include intrusion detection systems (IDSs), intrusion prevention systems (IPSs), vulnerability assessment tools, firewalls, anti-virus tools, anti-spam tools, encryption tools, application audit logs, and physical security logs.

Types of data sources 110 include security detection and proxy systems, access and policy controls, core service logs and log consolidators, network hardware, encryption devices, and physical security. Exemplary security detection and proxy systems include IDSs, IPSs, multipurpose security appliances, vulnerability assessment and management, anti-virus, honeypots, threat response technology, and network monitoring. Exemplary access and policy control systems include access and identity management, virtual private networks (VPNs), caching engines, firewalls, and security policy management. Exemplary core service logs and log consolidators include operating system logs, database audit logs, application logs, log consolidators, web server logs, and management consoles. Exemplary network hardware includes routers and switches. Exemplary encryption devices include data security and integrity. Exemplary physical security systems include card-key readers, biometrics, burglar alarms, and fire alarms.

In the illustrated embodiment, the SIEM system 100 includes one or more agents 120, one or more managers 130, one or more databases 140, one or more online archives 150, one or more user interfaces 160, and one or more logging systems 170. In some embodiments, these modules are combined in a single platform or distributed in two, three, or more platforms (such as in FIG. 1). The use of this multi-tier architecture supports scalability as a computer network or system grows. The SIEM system 100 is further described in U.S. Pat. No. 7,376,969, issued May 20, 2008, which is hereby incorporated by reference herein in its entirety.

An agent 120 provides an interface to a data source 110. Specifically, the agent 120 collects data ("raw events") from a data source 110, processes the data, and sends the processed data ("events") to a manager 130. The agent 120 can operate anywhere, such as at a separate device communicating via a protocol such as simple network management protocol (SNMP) traps, at a consolidation point within the network, or at the data source 110. For example, if the data source 110 is a software application, the agent 120 can be co-hosted on the device that hosts the data source. In one embodiment, the agent 120 is the Connector product from ArcSight, Inc. of Cupertino, Calif.

Processing can include normalization, aggregation, and filtering. For example, individual raw events are parsed and normalized for use by the manager 130. Normalization can involve normalizing values (such as severity, priority, and time zone) into a common format and/or normalizing a data structure into a common schema. Events can be categorized using a common, human-readable format. This format makes it easier for users to understand the events and makes it easier to analyze the events using filters, rules, reports, and data monitors. In one embodiment, the common format is the Common Event Format (CEF) log management standard from ArcSight, Inc. Normalization is further described in U.S. application Ser. No. 10/308,941, filed Dec. 2, 2002, which is hereby incorporated by reference herein in its entirety.

Aggregation and filtering reduce the volume of events sent to the manager 130, which saves network bandwidth and storage space, increases the manager's efficiency and accuracy, and reduces event processing time. Aggregation is further described in U.S. application Ser. No. 10/308,584, filed Dec. 2, 2002, and U.S. application Ser. No. 10/975,962, filed Oct. 27, 2004, which are hereby incorporated by reference herein in their entirety. The agent 120 sends events to the manager 130 in batches based on the expiration of a time period or based on a threshold number of events being reached. Batching events for transmission to the manager 130 is further described in U.S. Pat. No. 7,219,239, issued May 15, 2007, which is hereby incorporated by reference herein in its entirety.

The agent 120 can also send commands to the data source 110 and/or execute commands on the local host, such as instructing a scanner to run a scan. These actions can be executed manually or through automated actions from rules and data monitors. Command support is further described in U.S. application Ser. No. 10/308,417, filed Dec. 2, 2002, which is hereby incorporated by reference herein in its entirety. The agent 120 can also add information to the data that it has collected, such as by looking up an Internet Protocol (IP) address and/or hostname in order to resolve IP/hostname lookup at the manager 130.

The agent 120 is configured via an associated configuration file (not shown). The agent 120 can include one or more software modules including a normalizing component, a time correction component, an aggregation component, a batching component, a resolver component, a transport component, and/or additional components. These components can be activated and/or deactivated through appropriate commands in the configuration file. During configuration, the agent 120 is registered to a manager 130 and configured with characteristics based on its data source 110 and desired behavior. The agent 120 is further configurable through both manual and automated processes. For example, the manager 130 can send to the agent 120 a command or configuration update. Agent components are further described in U.S. application Ser. No. 10/308,548, filed Dec. 2, 2002, which is hereby incorporated by reference herein in its entirety. Additional agent capabilities are described in U.S. application Ser. No. 10/974,105, filed Oct. 27, 2004; U.S. application Ser. No. 11/021,601, filed Dec. 23, 2004; U.S. application Ser. No. 11/070,024, filed Mar. 1, 2005; and U.S. Pat. No. 7,437,359, issued Oct. 14, 2008, which are hereby incorporated by reference herein in their entirety.

A manager 130 provides analysis capabilities, case management workflow capabilities, and services capabilities. Communications between the manager 130 and an agent 120 can be bi-directional (e.g., to enable the manager 130 to transmit a command to the platform hosting the agent 120) and encrypted. In some installations, the manager 130 can act as a concentrator for multiple agents 120 and can forward information to other managers 130 (e.g., managers deployed at a corporate headquarters). To perform its tasks, the manager 130 uses a variety of filters, rules, reports, data monitors, dashboards, and network models. In one embodiment, the manager 130 is a Java-based server such as the Enterprise Security Manager (ESM) product from ArcSight, Inc.

Analysis can include detection, correlation, and escalation. For example, the manager 130 cross-correlates the events received from the agents 120 using a rules engine (not shown), which evaluates each event with network model and vulnerability information to develop real-time threat summaries. Correlation is further described in U.S. application Ser. No. 10/308,767, filed Dec. 2, 2002, which is hereby incorporated by reference herein in its entirety. Regarding case management, the manager 130 can maintain reports regarding the status of security incidents and their resolution. Incident reports are further described in U.S. application Ser. No. 10/713,471, filed Nov. 14, 2003, which is hereby incorporated by reference herein in its entirety. Services can include administration, notification, and reporting. The manager 130 can also provide access to a knowledge base. Additional manager capabilities are described in U.S. application Ser. No. 10/821,459, filed Apr. 9, 2004; U.S. Pat. No. 7,260,844, issued Aug. 21, 2007; U.S. Pat. No. 7,565,696, issued Jul. 21, 2009; and U.S. Pat. No. 7,509,677, issued Mar. 24, 2009, which are hereby incorporated by reference herein in their entirety.

As events are received by the manager 130, they are stored in a database 140. Storing the events enables them to be used later for analysis and reference. In one embodiment, the database 140 is a relational database management system such as a database from Oracle Corporation of Redwood Shores, Calif.

In one embodiment, the database 140 stores data in partitions, which are chronological slices of the database. For example, one new partition is created each day to store that day's events. A partition can be compressed and stored in an online archive 150 for later retrieval. Partition management is further described in U.S. application Ser. No. 10/839,563, filed May 4, 2004, which is hereby incorporated by reference herein in its entirety. In one embodiment, partition management is provided by the SmartStorage archiving and retrieval component of the Security Lifecycle Information Management (SLIM) product from ArcSight, Inc.

A user interacts with the manager 130 via a user interface 160. The user interface 160 enables the user to navigate the features and functions of the manager 130. A single manager 130 can support multiple user interface instances. The features and functions that are available to the user can depend on the user's role and permissions and/or the manager's configuration. In one embodiment, access control lists enable multiple security professionals to use the same manager 130 and database 140 but each professional has his own views, correlation rules, alerts, reports, and knowledge bases appropriate to his responsibilities. Communication between the manager 130 and the user interface 160 is bi-directional and can be encrypted.

In one embodiment, there are two types of user interfaces 160: a workstation-based interface and a web browser-based interface. The workstation interface is a standalone software application that is intended for use by full-time security staff in a Security Operations Center (SOC) or similar security monitoring environment. The workstation interface includes an authoring tool for creating and modifying filters, rules, reports, pattern discovery, dashboards, and data monitors. The workstation interface also enables a user to administer users, database partitions, and workflow (e.g., incident investigation and reporting). For example, the workstation interface enables a user to perform routine monitoring, build complex correlation and long sequence rules, and perform routine administrative functions. In one embodiment, the workstation interface is the ESM Console product from ArcSight, Inc. The user interface is further described in U.S. application Ser. No. 10/308,418, filed Dec. 2, 2002, and U.S. Pat. No. 7,333,999, issued Feb. 19, 2008, which are hereby incorporated by reference herein in their entirety.

The web interface is an independent and remotely installable web server that provides a secure interface with the manager 130 for web browser clients. The web interface is intended for use as a streamlined interface for customers of Managed Service Security Providers (MSSPs), SOC operators, and users who need to access the manager 130 from outside the protected network. Because the web server can be installed at a location remote from the manager 130, the web server can operate outside the firewall that protects the manager 130. The web interface provides event monitoring and drill-down capabilities. In one embodiment, as a security feature, the web interface does not enable authoring or administrative functions. In one embodiment, the web interface is the ArcSight Web product from ArcSight, Inc.

In one embodiment, a logging system 170 is an event data storage appliance that is optimized for extremely high event throughput. The logging system 170 stores security events (sometimes referred to as "log data"). In one embodiment, the security events are stored in compressed form. However, the logging system 170 can retrieve these events on demand and restore them to their original, unmodified form for forensics-quality data. Multiple logging systems 170 can work together to scale up to support high sustained input rates when storing events. Event queries can be distributed across a peer network of logging systems 170. A user can configure the logging system 170 via a user interface (not shown). In one embodiment, the logging system 170 is the Logger product from ArcSight, Inc.

The logging system 170 can receive both processed events (e.g., events adhering to the Common Event Format) and raw events. In one embodiment, raw events are received directly from data sources 110 (such as syslog messages and log files), and processed events are received from agents 120 or managers 130. The logging system 170 can also send both raw events and processed events. In one embodiment, raw events are sent as syslog messages (to any device; not shown), and processed events are sent to the manager 130. The logging system 170 will be further described below.

Through the above-described architecture, the SIEM system 100 can support a centralized or decentralized environment. This is useful because an organization may want to implement a single instance of the SIEM system 100 and use an access control list to partition users. Alternatively, the organization may choose to deploy separate SIEM systems 100 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. SIEM systems 100 can also be deployed in a corporate hierarchy where business divisions work separately and support a rollup to a centralized management function.

2. Log Data

Described herein are systems and methods for storing log data efficiently while supporting querying. "Log data," as used herein, can be generated by various sources, including both devices and applications. These sources include, for example, the data sources 110 described above as well as network systems, computers, operating systems, anti-virus systems, databases, physical infrastructure, identity management systems, directory services, system health information systems, web traffic, legacy systems, proprietary systems, mainframes, mainframe applications, security systems, physical devices, and SIEM sources (such as agents 120 and managers 130).

A system can obtain log data in many ways. For example, log data can be received (e.g., according to the syslog protocol). Alternatively, log data can be accessed (e.g., by reading a file that is stored locally or remotely). Other methods include, for example, Open Database Connectivity (ODBC), Simple Network Management Protocol (SNMP) traps, NetFlow, and proprietary Application Programming Interfaces (APIs). Log data can also be input by a user (e.g., using a command line interface (CLI)).

Log data can be in any format. One such format is, for example, Common Event Format (described above). Other formats are, for example, specific to the data sources 110 that generated the log data.

Log data is comprised of one or more data instances called "events." An event can be, for example, an entry in a log file, an entry in a syslog server, an alert, an alarm, a network packet, an email, or a notification page. In general, an event is generated once and does not change afterwards.

In one embodiment, an event includes implicit meta-data and a message. Implicit meta-data can include information about, for example, the device or application that generated the event ("event source") and when the event was received from the event source ("receipt time"). In one embodiment, the receipt time is a date/time stamp, and the event source is a network endpoint identifier (e.g., an IP address or Media Access Control (MAC) address) and/or a description of the source, possibly including information about the product's vendor and version.

The message represents what was received from the event source and can be in any form (binary data, alphanumeric data, etc.). In one embodiment, the message is free-form text that describes a noteworthy scenario or change. In another embodiment, the message also includes explicit meta-data. Explicit meta-data is obtained, for example, by parsing the message. When an event source generates an event, the event usually includes information that indicates when the event occurred ("event occurrence time"). The event occurrence time, which is usually a date/time stamp, is an example of explicit meta-data and is frequently used for analysis. Different event sources often produce non-uniform explicit meta-data (e.g., priority or criticality of event, devices/applications/users affected by event, and which user triggered event).

In one embodiment, if an event does not include an occurrence time, an implicit timestamp generated by an event receiver when it received the event (described below) is treated as the original occurrence timestamp. As an event is processed and potentially forwarded through various systems, each system usually has an implicit notation of event receipt time.

In one embodiment, an event represents a data structure that includes one or more fields, where each field can contain a value (sometimes referred to as an "attribute"). The size of this data structure usually falls within the range of 100 bytes to 10 kilobytes.

3. Row Stores and Column Stores

If different events include the same types of fields, then the events can be organized in a table. Each row of the table would represent a different event, and each column of the table would represent a different field.

The event data can be stored in a database using two architectures: row store and column store. In the row store architecture, storage is record-(row-) oriented. The attributes (field values) of a record (or tuple) are placed contiguously in storage. In this architecture, a single disk write suffices to push all of the fields of a single record out to disk. Hence, high performance writes are achieved, and a database management system (DBMS) with a row store architecture is called a write-optimized system (WOS).

In the column store architecture, storage is field-(column-) oriented. The values stored in one column, across multiple records, are placed contiguously in storage. In this architecture, a DBMS needs to read the values of only those columns that are required for processing a given query and can avoid loading into memory irrelevant field values (attributes). Hence, high performance ad-hoc querying is achieved, and a DBMS with a column store architecture is called a read-optimized system (ROS).

U.S. application Ser. No. 11/966,078 ("the '078 application") describes storing event data using row-based "chunks." Specifically, the '078 application describes a logging system that includes an event receiver and a storage manager. The receiver receives log data, processes it, and outputs a row-based data "chunk." The manager receives the row-based data chunk and stores it so that it can be queried. The receiver includes buffers that store events and a metadata structure that stores information about the contents of the buffers. The metadata includes a unique identifier associated with the receiver, the number of events in the buffers, and, for each "field of interest," a minimum value and a maximum value that reflect the range of values of that field over all of the events in the buffers. A chunk includes the metadata structure and a compressed version of the contents of the buffers. The metadata structure acts as a search index when querying event data. The logging system can be used in conjunction with a security information/event management (SIEM) system.

In the '078 application, a chunk includes the contents of the event receiver buffers (in compressed form), and the buffers contain one or more events. Thus, a chunk contains one or more events. Since an event can be thought of as a row of a table, a chunk can be thought of as containing one or more rows of a table. In other words, the chunks described in the '078 application follow a row store architecture.

Although the chunks described in the '078 application were row-based, there is no reason why chunks cannot follow a column store architecture. For example, consider the buffers in the event receiver that store events. In the '078 application, these events were concatenated together, one event after the other, to be put into a (row-based) chunk. A different way to build a chunk would be to store each column of the event "table" as a different (column-based) chunk. Each column-based chunk would represent a column in the table (i.e., a set of values for the same field in multiple events). Rather than representing the table as one big row-based chunk that contained all of the rows (events), the table would be represented as multiple column-based chunks (one for each column of the table).

The present application describes storing event data using column-based chunks such that the chunks follow a column store architecture. The present application also describes storing event data using a combination of row-based chunks and column-based chunks. Pure column-based storage will be described first, followed by the combination row-based and column-based storage.

4. Logging System Architecture

Figure 2:
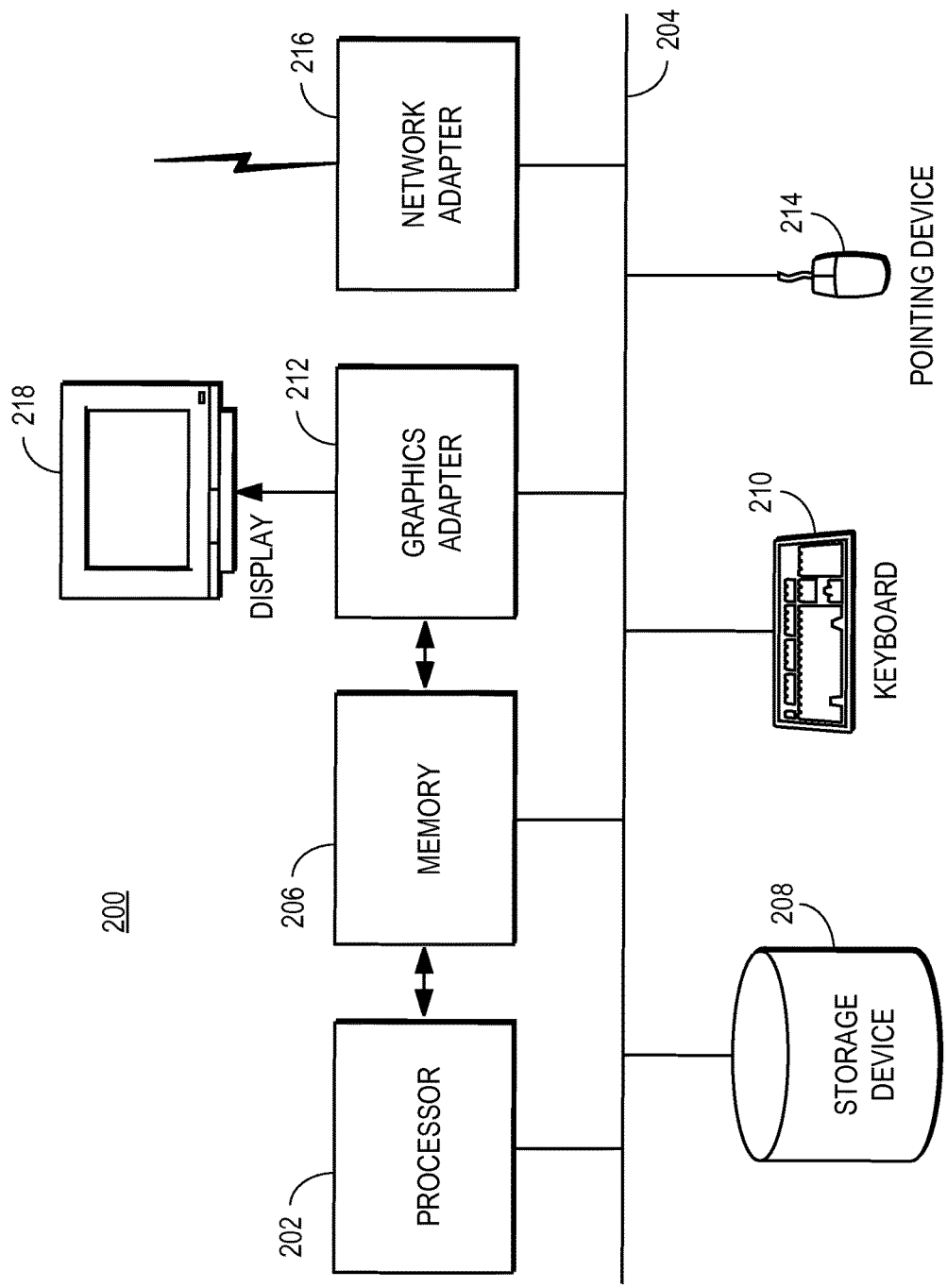
FIG. 2 is block diagram illustrating a computer for acting as a logging system of a security information/event management system, according to one embodiment.

FIG. 2 is a high-level block diagram of a computer 200 for acting as a logging system 170 of a security information/event management (SIEM) system 100 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. In one embodiment, the functionality of the bus 204 is provided by an interconnecting chipset. A display 218 is coupled to the graphics adapter 212.

The storage device 208 is any device capable of holding data, like a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to a local or wide area network.

As is known in the art, a computer 200 can have different and/or other components than those shown in FIG. 2. In addition, the computer 200 can lack certain illustrated components. For example, a computer 200 acting as a logging system 170 can lack a keyboard 210, pointing device 214, graphics adapter 212, and/or display 218. Moreover, the storage device 208 can be local and/or remote from the computer 200 (such as embodied within a storage area network (SAN)).

Figure 3:
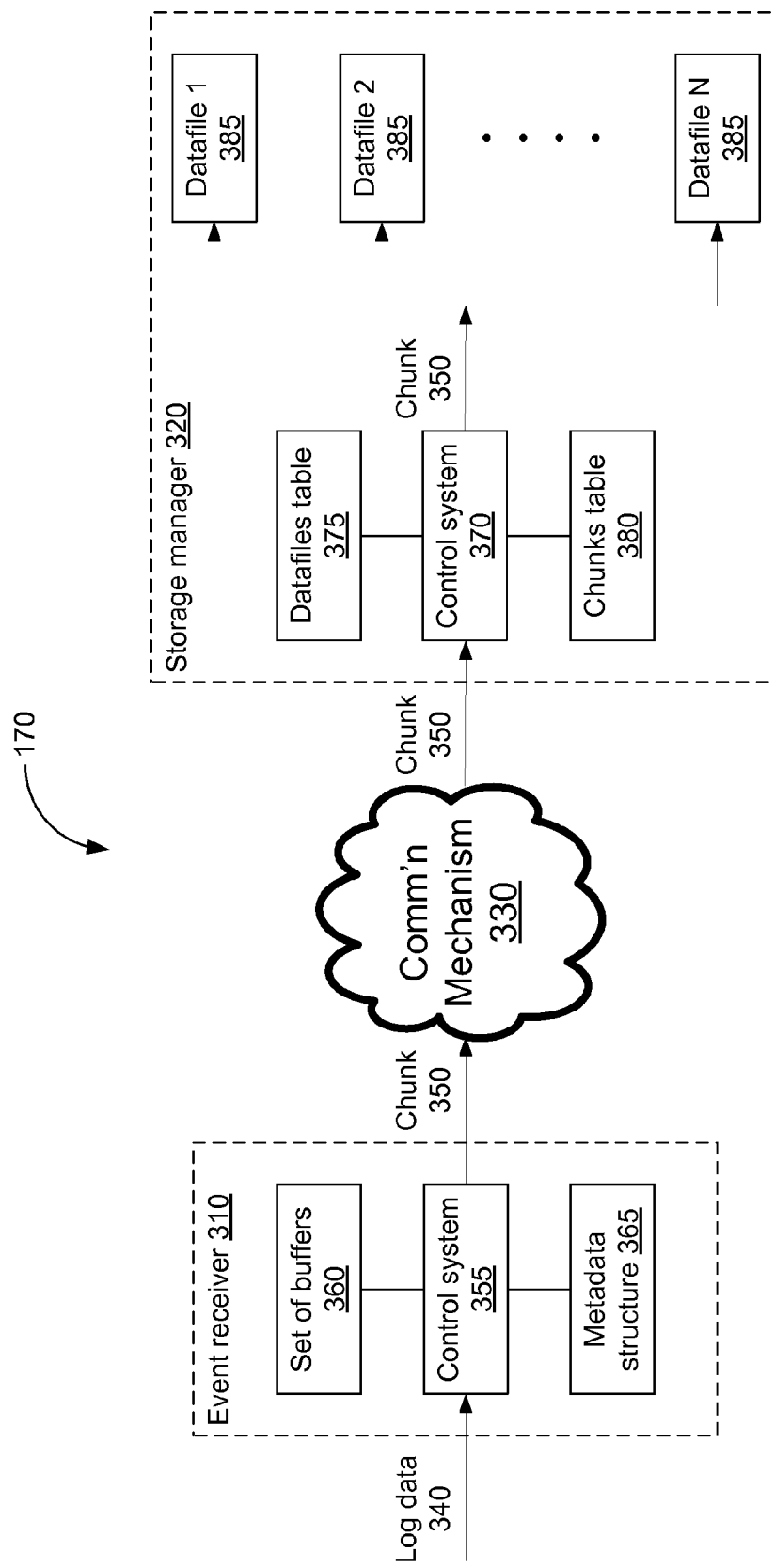
FIG. 3 is a block diagram illustrating a logging system of a security information/event management system, according to one embodiment.

FIG. 3 is a block diagram illustrating a logging system 170 of a security information/event management (SIEM) system 100, according to one embodiment. In the illustrated embodiment, the logging system 170 includes an event receiver 310, a storage manager 320, and a communication mechanism 330. Although only one event receiver 310 is shown for clarity, the system 170 can support a large number of concurrent sessions with many event receivers 310. In one embodiment, each event receiver 310 is associated with a unique identifier.

The event receiver 310 receives log data 340, processes the log data 340, and outputs a data "chunk" 350. The event receiver 310 includes a control system 355, a set of one or more buffers 360, and a metadata structure 365. The control system 355 is communicatively coupled to the set of one or more buffers 360 and the metadata structure 365.

The control system 355 controls operation of the event receiver 310 and is further described below with reference to FIG. 4.

Each buffer 360 stores information regarding one or more events. In one embodiment, a buffer's size is fixed but the size itself is configurable. Recall that if different events include the same types of fields, then the events can be organized in a table. Each row of the table would represent a different event, and each column of the table would represent a different field. In one embodiment, each buffer 360 is associated with a particular field and includes values from that field ("attributes") from one or more events. In another embodiment, each buffer 360 also includes an identifier ("IndexID") that indicates which field is associated with the buffer.

For example, assume that an event includes a field called SourceIPAddress whose value reflects the IP address of the device that initiated the action represented by the event. A buffer 360 associated with the SourceIPAddress field would contain one or more IP addresses (one IP address for each event that was received and processed by the event receiver 310 as part of the log data 340). The buffer 360 might also contain an IndexID value of "100," which indicates the SourceIPAddress field.

In one embodiment, the set of buffers 360 includes one buffer for each event field. When an event is received, each field value is parsed out and stored in the appropriate buffer (described below). Eventually, each buffer is stored as a separate column-based chunk (discussed below). In this way, each column of the event "table" is stored as a different (column-based) chunk. Each column-based chunk would represent a column in the table (i.e., a set of values for the same field in multiple events). Rather than representing the table as one big row-based chunk that contained all of the rows (events), the table would be represented as multiple column-based chunks (one for each column of the table).

In another embodiment, the set of buffers also includes a ReceiptTime buffer that stores, for each event, a time/date stamp that reflects when the event was received by the event receiver 310. In yet another embodiment, the set of buffers also includes a buffer that stores, for each event, a "derived" value that is determined based on the values stored in one or more fields of an event.

The metadata structure 365 stores metadata about the contents of the set of buffers 360. In one embodiment, this metadata includes the unique identifier associated with the event receiver 310 that received the events, the number of events in the set of buffers, and, for each of one or more "fields of interest," a minimum value and a maximum value that reflect the range of values of that field over all of the events in the set of buffers. The metadata structure 365 acts as a search index when querying event data (described below).

For example, assume that an event includes a field called OccurrenceTime whose value reflects the time that the event occurred. If OccurrenceTime were a field of interest, the metadata structure 365 would include a minimum value for OccurrenceTime and a maximum value for OccurrenceTime. The minimum value of OccurrenceTime would be the OccurrenceTime for the event in the set of buffers 360 that occurred first. The maximum value of OccurrenceTime would be the OccurrenceTime for the event in the set of buffers 360 that occurred last.

In one embodiment, ReceiptTime is also a field of interest. In this embodiment, therefore, the metadata structure 365 also stores a minimum value and a maximum value that reflect the range of values of receipt times over all of the events in the set of buffers. The minimum value of ReceiptTime would be the ReceiptTime for the event in the set of buffers 360 that was received first. The maximum value of ReceiptTime would be the ReceiptTime for the event in the set of buffers 360 that was received last. In one embodiment, only the minimum value of ReceiptTime is stored. In this embodiment, the maximum value of ReceiptTime is not stored; this decreases storage requirements. If a buffer 360 is flushed often (which happens when a chunk is generated, described below), the maximum value of ReceiptTime will be close to the minimum value of ReceiptTime (e.g., one second later).

In one embodiment, a field of interest is not an event field per se. Instead, it is a "derived" value that is determined based on the values stored in one or more fields of an event.

The storage manager 320 receives data chunks 350 and stores them so that they can be queried. The storage manager 320 includes a control system 370, a datafiles table 375, a chunks table 380, and one or more datafiles 385. The control system 370 is communicatively coupled to the datafiles table 375, the chunks table 380, and the one or more datafiles 385.

The control system 370 controls operation of the storage manager 320 and is further described below with reference to FIG. 4.

The datafiles table 375 stores information about the one or more datafiles 385. In one embodiment, each entry in the datafiles table 375 represents one datafile 385 for which space has been allocated, and the entry includes a unique identifier associated with the datafile and the location of the datafile (e.g., a file system, a path therein, and a file name). A datafile 385 listed in the datafiles table 375 may or may not contain data (e.g., chunks 350). The datafiles table 375 is stored, for example, in a database (not shown). In one embodiment, datafiles 385 are allocated before they are needed. In this embodiment, a list of these pre-allocated datafiles 385 (called a "free list") is maintained.

The chunks table 380 stores information about the one or more chunks 350 that are stored in the storage manager 320 (specifically, stored in the one or more datafiles 385). In one embodiment, this information includes, for each chunk 350, the metadata stored in the chunk (described below) and the location of the chunk (e.g., the unique identifier associated with the datafile that stores the chunk and the location within the datafile where the chunk is stored (e.g., as an offset)). The chunks table 380 is stored, for example, in a database (not shown).

A datafile 385 stores multiple chunks 350. In one embodiment, all datafiles are the same size (e.g., 1 gigabyte) and are organized in time order. The datafile 385 is stored, for example, on a raw disk or in a data storage system such as a file system (not shown). If the datafile 385 is stored on a raw disk, data can be accessed faster, since additional layers of indirection are not required. Also, security can be increased.

The communication mechanism 330 communicatively couples the event receiver 310 and the storage manager 320. In one embodiment, the communication mechanism 330 includes a partially-public or wholly-public network such as the Internet. In other embodiments, the communication mechanism 330 includes a private network or one or more distinct or logical private networks (e.g., virtual private networks or local area networks). Communication links to and from the communication mechanism 330 can be wired or wireless (e.g., terrestrial- or satellite-based transceivers). In one embodiment, the communication mechanism 330 is a packet-switched network such as an IP-based wide or metropolitan area network that uses the Ethernet protocol.

In another embodiment, the communication mechanism 330 is local to a single computer system (e.g., if a portion of the event receiver 310 and a portion of the storage manager 320 are executing on the same device). In this embodiment, the communication mechanism 330 is implemented, for example, through a local, software-only loopback device. For example, the data is copied to various locations in memory, and communication occurs via an API.

In yet another embodiment, the communication mechanism 330 is local to a single process (e.g., if a portion of the event receiver 310 and a portion of the storage manager 320 are executing on the same device and in the same process). In this embodiment, the communication mechanism 330 is implemented, for example, through shared memory and/or pointers thereto.

5. Initial Storage

Figure 4:
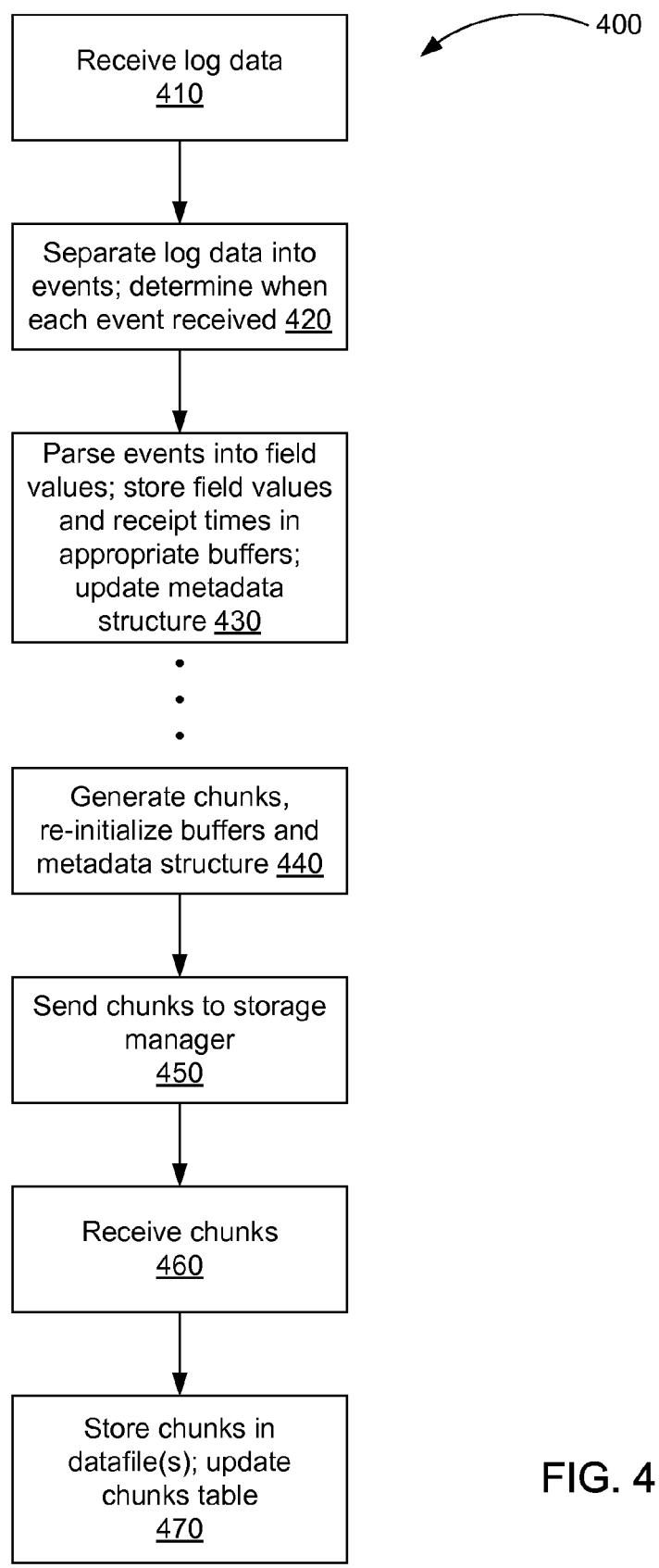
FIG. 4 is a flowchart illustrating a method for storing log data, according to one embodiment.

FIG. 4 is a flowchart illustrating a method for storing log data, according to one embodiment of the invention. In one embodiment, the method 400 of FIG. 4 is performed jointly by the event receiver 310 (e.g., its control system 355) and the storage manager 320 (e.g., its control system 370).

In one embodiment, before the method 400 begins, the set of buffers 360 and the metadata structure 365 are initialized. For example, the control system 355 stores, in each buffer, the appropriate IndexID. The control system 355 also stores in the metadata structure 365 the unique identifier associated with the event receiver 310.

The method 400 begins when the event receiver 310 receives 410 log data 340. In one embodiment, the log data 340 is received in the form of a stream.

The control system 355 separates 420 the log data into one or more events and determines 420 when each event was received by the event receiver 310.

The control system 355 parses 430 the events into their field values and stores the field values and receipt times in the appropriate buffers. The control system 355 also updates 430 the metadata structure 365. For example, the number of events in the buffer will have increased. The minimum and maximum values for the field(s) of interest may also need to be updated. In one embodiment, data write operations and metadata write operations are synchronized in order to avoid possible inconsistency if a system crash occurs. For example, a transactional database system is used so that if field values are stored in the buffer 360, the metadata structure 365 is guaranteed to be updated accordingly, even if the underlying system crashes in between the two steps.

At some point in time (see below), the control system 355 generates 440 data chunks 350 based on the metadata structure 365 and the contents of the buffers 360. Specifically, one chunk is generated for each buffer. Different chunks can have different sizes. Chunk sizes can differ due to, for example, the type of field values stored in a chunk (and the compression algorithm applied to them, discussed below), and the type of trigger that caused the chunk to be generated (also discussed below). In one embodiment, a maximum chunk size can be specified.

In one embodiment, each chunk includes the metadata structure 365, the contents of the associated buffer, a chunk identifier (ChunkID), a stripe identifier (StripeID), and a set of index location identifiers (IndexLocationIDs). Note that the field of interest, which concerns the meta-data portion of a chunk, and the field associated with the buffer, which concerns the "payload" portion of a chunk, need not be the same field. The ChunkID uniquely identifies the chunk with respect to other chunks. The StripeID, which is shared among the set of chunks, is used to associate the chunks with each other (since all of the chunks concern the same set of events). The next time the control system 355 generates 440 data chunks 350, the chunks will concern a different set of events, so a different StripeID will be used. The set of IndexLocationIDs includes one IndexLocationID for each field value in the buffer/chunk. The IndexLocationID is used to access a field value in a different chunk that corresponds to the same event. In one embodiment, the IndexLocationID includes the StripeID and an offset identifier (OffsetID). The OffsetID indicates which field value (within a buffer/chunk) corresponds to the desired event.

In one embodiment, the contents of the associated buffer 360 are compressed before they are stored in the chunk 350. Compressing the buffer contents makes this approach a cost-effective choice for long-term storage of data. The compressed version of the contents can be generated using any data compression algorithm.

In one embodiment, a column-type-specific compression algorithm is used. For example, a column-based chunk that contains timestamps (such as the chunk associated with the ReceiptTime field) can use delta encoding. Delta encoding stores the difference relative to a previous value, rather than storing the value itself. For example, if the original value is a sequence of <88888123, 88888125, 88888126, 88888127, 88888128>, then delta encoding would yield a sequence of <88888123, 2, 1, 1, 1>. As another example, a low cardinality column can use common string compression. A unique string symbol table is generated. The index of the entry in the symbol table is stored, rather than the string itself. For example, if the original value is a sequence of <Success, Failure, Success, Failure, Success, Success, Failure> and the symbol table is <Success, Failure>, then common string compression would yield a sequence of <0, 1, 0, 1, 0, 0, 1>. In another embodiment, a different lossless compression algorithm is used, such as GNU zip (gzip).

In one embodiment, the chunk 350 also includes a "magic number" and a version identifier. The magic number, sometimes called a file signature, is a short sequence of bytes that identifies the data type of the chunk. For example, the magic number is reasonably unique (i.e., unique with a high probability) across other data and file formats, including other chunks. Thus, when a chunk is read, it is easy to determine whether the chunk is in the expected format. If the chunk's actual magic number differs from the expected magic number, then the chunk is "wrong" (e.g., corrupted). The magic number thereby helps detect data corruption and resynchronize data chunk boundaries in order to recover corrupt data. (If the actual magic number matches the expected magic number, then data that occurs later in the chunk might still be wrong. However, the matching magic number excludes this possibility for the majority of common situations.) The version identifier enables the accommodation of data and file formats that have changed. For example, when a chunk is read, the version identifier can be used in conjunction with the magic number to indicate additional information about the data or file format.

In another embodiment (also not shown), the control system 355 also generates a message digest of the contents of a buffer 360. For example, the control system 355 applies a cryptographic hash function to the bytes stored in the buffer 360. Any cryptographic hash function can be used, such as Message-Digest algorithm 5 (MD5) or an algorithm in the Secure Hash Algorithm family (e.g., SHA-256). In one embodiment, the digest value is stored in the chunk 350. This value can later be used to determine whether the buffer data that is stored in the chunk (in compressed form) has been changed or tampered with. This helps guarantee the integrity of stored events by making it noticeable when events have been changed. Also, when the chunk 350 arrives at the storage manager 320, the digest value can be stored in the chunks table 380 along with the chunk's metadata. That way, if the chunk is later tampered with (or corrupted) while it is stored in a datafile 385, the message digest of the tampered chunk will not match the message digest that was previously stored in the chunks table 380.

The set of buffers 360 and the metadata structure 365 are then re-initialized 440, thereby flushing the buffers 360. In one embodiment, the set of buffers 360 includes additional buffers that can be used to store incoming events while other buffers are full or are being flushed.

In one embodiment, step 440 is performed ("triggered") when any one of the buffers 360 is full. In another embodiment, step 440 is performed (triggered) when a particular period of time (a "timeout window") has elapsed, during which no events were received by the event receiver 310.

The control system 355 sends 450 the data chunks 350 to the storage manager 320.

The storage manager 320 receives 460 the chunks 350. The control system 370 stores 470 the chunks in one or more datafiles 385 (see below). In one embodiment, a chunk is encrypted before it is stored for security purposes. The control system 370 also updates 470 the chunks table 380. For example, the control system 370 adds to the table information regarding the chunks 350 that it just stored in the datafile(s) 385.

The control system 370 writes chunks 350 in "appending" order inside each datafile 385. This is sometimes referred to as "write-once journaled." In one embodiment, the control system maintains a "write pointer" that indicates a location within a datafile where a chunk can be written. After a chunk has been written to a datafile, the write pointer is modified to indicate a location within the same datafile (specifically, at the end of the chunk that was just written). If writing a chunk fills a datafile, the write pointer is modified to indicate a location within a different datafile (specifically, at the beginning) that can be used to store chunks. In one embodiment (not shown), chunk writes are deferred by first caching chunks in memory. Multiple continuous chunks are then combined into one write operation in order to optimize full-stripe writes on RAID 5 disk storage systems. By using large sequential input operations such as writes, the hardware is driven at a high speed, throughput, and concurrency.

If a pre-allocated datafile exists (e.g., as listed in the free list described above), the control system 370 uses the datafile and removes that datafile's unique identifier from the free list (since that datafile is no longer available). If no pre-allocated datafile exists, the control system 370 creates a new one by locating available space and updating the datafiles table 375. For example, the control system 370 adds to the table information regarding the new datafile 385 that it just created. In one embodiment, the unique identifier assigned to the new datafile 385 is equal to the sum of 1 and the unique identifier associated with the datafile 385 that was most recently allocated.

The method 400 has many desirable characteristics. For example, it is highly scalable, since it can support receiving a very high number of events-per-second (EPS). Multiple event receivers 310 can be used, and the writing of event data is fast because it involves only append operations, not seek operations. The method 400 also features high availability, since it provides continuous access to data. Deleting old events does not fragment the storage medium, which means that no defragmentation process is required and therefore no maintenance window is required, either. Implicit downtime for cleanup tasks is not required. Also, since disk write operations are efficient, they avoid overhead in order to leave room for handling queries.

6. Storage Reclamation

Figure 5:
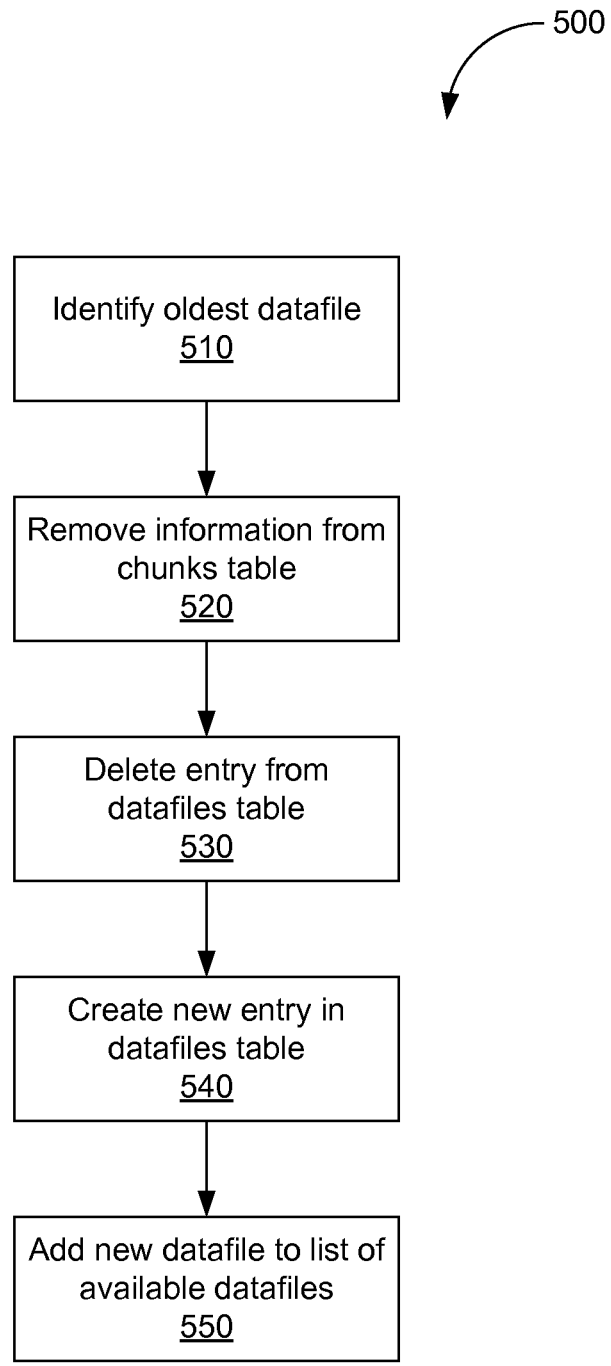
FIG. 5 is a flowchart illustrating a method for reclaiming storage, according to one embodiment.

At some point in time (discussed below), storage being used by one or more datafiles 385 is reclaimed for future use. FIG. 5 is a flowchart illustrating a method for reclaiming storage, according to one embodiment. In one embodiment, the method 500 of FIG. 5 is performed by the storage manager 320 (e.g., its control system 370).

The oldest datafile 385 associated with a particular retention policy (described below) is identified 510. Since datafiles have unique identifiers based on monotonically increasing numbers, it is easy to query the datafiles table 375 to find the oldest datafile (i.e., the datafile that has the lowest unique identifier) associated with the retention policy.

Information regarding all of the chunks 350 contained in the identified datafile 385 is removed 520 from the chunks table 380.

The entry in the datafiles table 375 that represents the identified datafile 385 is deleted 530.

A new entry is created 540 in the datafiles table 375, with a) a new unique identifier that is one higher than the highest used datafile identifier and b) a path attribute referring to the physical location of the previously oldest datafile (i.e., the datafile that was identified in step 510).

The newly reclaimed datafile 385 is added 550 to the list of available pre-allocated datafiles and is ready to receive new chunks.

In the illustrated embodiment, when a datafile's storage is reclaimed, that datafile is recycled (e.g., reused or written over) instead of deleted.

The details of the storage reclamation algorithm (including, for example, when to execute it and how much storage to reclaim) depend on a retention policy associated with a datafile 385. A retention policy limits the retention of a chunk 350 based on, for example, a disk-space usage threshold or a maximum time to retain the chunk. Examples of when to execute the storage reclamation algorithm are: when all of the datafiles associated with that policy are full and no more datafiles can be allocated (e.g., because there is no storage space left); when a particular threshold has been reached (e.g., in terms of the amount of free storage space left for datafiles associated with that retention policy); when a particular period of time has elapsed; when a particular number of datafiles exist that are associated with that policy; and when the oldest chunk in a datafile associated with that policy has reached a threshold age. In one embodiment, a datafile is backed up onto another system before its space is reclaimed. In this way, more storage can be made available while still maintaining existing data.

In one embodiment, all datafiles 385 are associated with the same retention policy. In another embodiment, multiple retention policies exist, and each datafile is associated with any one of the multiple retention policies. Multiple datafiles can be associated with the same retention policy. A retention policy can be created and modified by a user. In one embodiment, the storage manager 320 logically maintains one instance of the storage reclamation algorithm described above for each retention policy. For example, each datafile 385 includes metadata that indicates the retention policy that applies to that datafile, and a chunk is stored in the datafile that corresponds to that chunk's retention policy.

If multiple retention policies exist, the system 170 shown in FIG. 3 is modified slightly (not shown). Specifically, the event receiver 310 includes one set of buffers 360 and one metadata structure 365 for each retention policy. Before field values are extracted from an event and stored in the set of buffers and the metadata structure is updated (step 430), the control system 355 determines which retention policy should be applied to the event. This determination is based on, for example, a static mapping or an attribute of the particular event. Any attribute can be used, such as priority or event source. Based on this determination, the control system 355 stores the event field values in the appropriate set of buffers and updates the appropriate metadata structure. Thus, all event field values in a particular set of buffers will be associated with the same retention policy.

It follows that the column-based chunks 350 generated based on that set of buffers will be associated with the same retention policy. Before the chunks are stored in a datafile 385 (step 470), the control system 370 determines the chunks' retention policy and stores the chunks in a datafile associated with that policy. Thus, all chunks in a particular datafile will be associated with the same retention policy.

Alternatively, column-based chunks associated different buffers 360 can be associated with different retention policies, even if the buffers are storing field values from the same set of events. For example, chunks that store fields that are searched more often can have a different retention policy than chunks that store fields that are searched less often. In this embodiment, a first field value from a first event could be associated with a first retention policy, and a second field value from the same event could be associated with a second (different) retention policy.

In one embodiment, each retention policy has its own group of datafiles 385. Each datafile is marked with a unique number. The number decides the order of the files within one group. The data files are written in appending order. Files are not updated, and files are written once and operated in append-only mode, which prevents log data tampering. As all files within one retention group are filled up, storage is reclaimed from the first (i.e., oldest) file in the group. In one embodiment, a separate datafiles table 375 is maintained for each retention policy, which contains entries for datafiles 385 that have been allocated to that retention policy. If a free list is maintained, only one free list is used for the entire storage manager 320, regardless of how many retention policies exist.

7. Querying/Data Retrieval

Recall that a row-based chunk contains complete information for a set of events. A column-based chunk of field values from that same set of events is a subset of the information contained in the row-based chunk. Since the column-based chunk contains less information than the row-based chunk, it is also faster to load into memory (e.g., from a datafile) and to search. Thus, if a search query term concerns the field of the column-based chunk, then it is faster to search the column-based chunk than to search the row-based chunk. Since the column-based chunk assists in searching, it is sometimes referred to as a "search index" or simply an "index."

After a chunk 350 has been stored in a datafile 385, the field values within the chunk can be queried. A query can be executed by itself or as part of handling an interactive search or generating a report. A query is represented as an expression that can be evaluated against an event. The expression includes one or more search terms. A search term concerns the contents of an event, specifically, a particular field and the value of that field. For example, the search term "TransportProtocol=TCP" concerns the TransportProtocol field and the value of that field being equal to "TCP." As another example, the search term "Priority contains 'High'" concerns the Priority field and the value of that field being equal to "'High.'". One common type of search term includes a timestamp field (e.g., EventReceipt) and a period of time (e.g., a start time and an end time). The result of executing a search query is often a set of one or more events. For example, the search query "select * from events where TransportProtocol=TCP" would return a set of events, each of which has a value of "TCP" in its TransportProtocol field.

In one embodiment, the query process occurs in multiple phases. The first phase filters data chunks 350 based on "field of interest" information (as stored in a chunk's metadata). The second phase filters data chunks 350 based on field values (as stored in a chunk's "payload"). The third phase assembles the events that satisfy the query. The first phase thereby acts as a "rough cut" for identifying which data chunks (and their corresponding events) should be investigated further and which data chunks (and their corresponding events) should be ignored. In most cases, the retention policy assigned to a chunk is not considered when events are queried or retrieved because it is not interesting which retention policy applies to a chunk that contains an event.

In the first phase, search terms within the query are identified that concern information that was contained in the metadata structure 365 (back when the event field values were stored in the buffers 360 rather than as part of a data chunk 350 in a datafile 385). This metadata information includes the unique identifier of the associated event receiver and, for each field of interest, a minimum value and a maximum value that together reflect the range of values of that field over multiple events (initially, events whose field values are stored in the same buffer; later, events whose field values are stored in the same data chunk). Recall that the metadata information was transmitted to the storage manager 320 as part of a chunk 150. Then, the metadata information was stored in the chunks table 380. Thus, in order to search the events based on this metadata, the "metadata search terms" are used to search the chunks table 380. This will yield which chunks (if any) could contain an event that satisfies the metadata search terms. In this way, a search can be constrained based on particular values (or ranges of values) for event receiver and/or fields of interest (since these values are stored in the metadata in the chunks table 380).

Because "field of interest" metadata is expressed as a range of values, the fact that a chunk satisfies a metadata search term does not necessarily mean that the chunk contains an event that satisfies the metadata search term. For example, if the metadata search term is a field value of 10 and the chunk contains events whose field values are 5 and 15, respectively, then 10 will fall within the range, and the chunk will be identified as satisfying the metadata search term. However, the chunk may not contain an event with a field value of 10. (That is why the query occurs in multiple phases.) What is always true, however, is that if a chunk could contain an event that satisfied the search term, then that chunk will be identified as satisfying the search term.

In the second phase, the data chunks 350 identified by the first phase are further filtered based on field values (as stored in a chunk's "payload"). Specifically, search terms within the query are identified that concern fields whose values are stored in a column-based chunk 350 (i.e., "indexed" fields).

For example, if a search term concerns the SourceIPAddress field, then a column-based chunk that is associated with the SourceIPAddress field is identified. (This can be done by examining the chunk's IndexID.) The requested value of the search term (e.g., a particular IP address) is then searched for within the identified chunk. If the payload portion of the chunk (i.e., the set of field values) is in a compressed format, then it is uncompressed before it is searched for the requested value of the search term.

In the third phase, the events that satisfy the query are assembled. Continuing the previous example, assume that a particular column-based chunk has been identified that is associated with the SourceIPAddress field. Further assume that a particular field value entry has been identified within the chunk as matching the requested value of the search term. That particular field value entry is associated with an IndexLocationID. The IndexLocationID is now used to obtain the remaining field values of the event.

Recall that the IndexLocationID includes a StripeID and an OffsetID. The StripeID is used to identify other column-based chunks that concern the same set of events. (In one embodiment, the storage manager 320 maintains a mapping of StripeID to list of ChunkIDs associated with that StripeID.) Once those other column-based chunks are identified, the appropriate field values (i.e., those field values that belong to the same event as the event identified based on the SourceIPAddress field) are obtained using the OffsetID.

As an example, consider a set of events, each of which includes a DeviceVendor field, a TransportProtocol field, and a Priority field. The search query "select * from events where TransportProtocol=TCP and Priority='Very High'" would return a set of events, each of which has a value of "TCP" in its TransportProtocol field and a value of "'Very High'" in its Priority field. The search query "select DeviceVendor from events where TransportProtocol=TCP and Priority='Very High'" would return only the DeviceVendor field values from the set of events (each of which has a value of "TCP" in its TransportProtocol field and a value of "'Very High'" in its Priority field).

Assume that DeviceVendor, TransportProtocol, and Priority are not "fields of interest" (and thus do not have value ranges stored in the metadata portions of any chunks). One way to execute this query is as follows: 1) Identify column-based chunks associated with the TransportProtocol field. Search those chunks for field values equal to "TCP." For each matching field value, store the associated IndexLocationID. 2) Identify column-based chunks associated with the Priority field. Search those chunks for field values equal to "'Very High.'" For each matching field value, store the associated IndexLocationID. 3) Determine the intersection of the IndexLocationIDs stored in (1) and the IndexLocationIDs stored in (2) (i.e., determine which IndexLocationIDs were stored in both (1) and (2)). 4) Identify column-based chunks associated with the DeviceVendor field. For each IndexLocationID in (3), determine the corresponding field value and return the value as part of the search results.

In one embodiment (not shown), the events are analyzed in a particular order. For example, the events are analyzed based on their event receipt time, in either ascending order (i.e., oldest events first) or descending order (newest events first). Analyzing the events in a particular order and appending matching events to the search results means that the events in the search results will already be in that particular order. No sorting of the events is required.

In the first phase, it is possible that none of the search terms concerns information that was contained in the metadata structure 365. If this happens, all chunks 350 will be identified as possibly containing an event field value that satisfies the metadata search terms (since no metadata search terms exist).

The above algorithm searches for event field values that are stored in chunks 350. However, the logging system 170 may contain additional event field values in the event receiver 310 (e.g., within the set of buffers 360) that have not yet been stored in a chunk. The algorithm above will not search these event field values. In one embodiment, before the algorithm is executed, the set of buffers 360 is flushed so that the event field values will be sent to the storage manager 320 and stored in a chunk. This way, when the algorithm is executed, the event field values that were formerly in the set of buffers will be searched also. In another embodiment, a separate search is executed on the event receiver 310 using the contents of the metadata structure 365 and the set of buffers 360, similar to the algorithm described above. This way, all event field values will be searched, whether they are stored in the storage manager 320 or in the event receiver 310.

Figure 6:
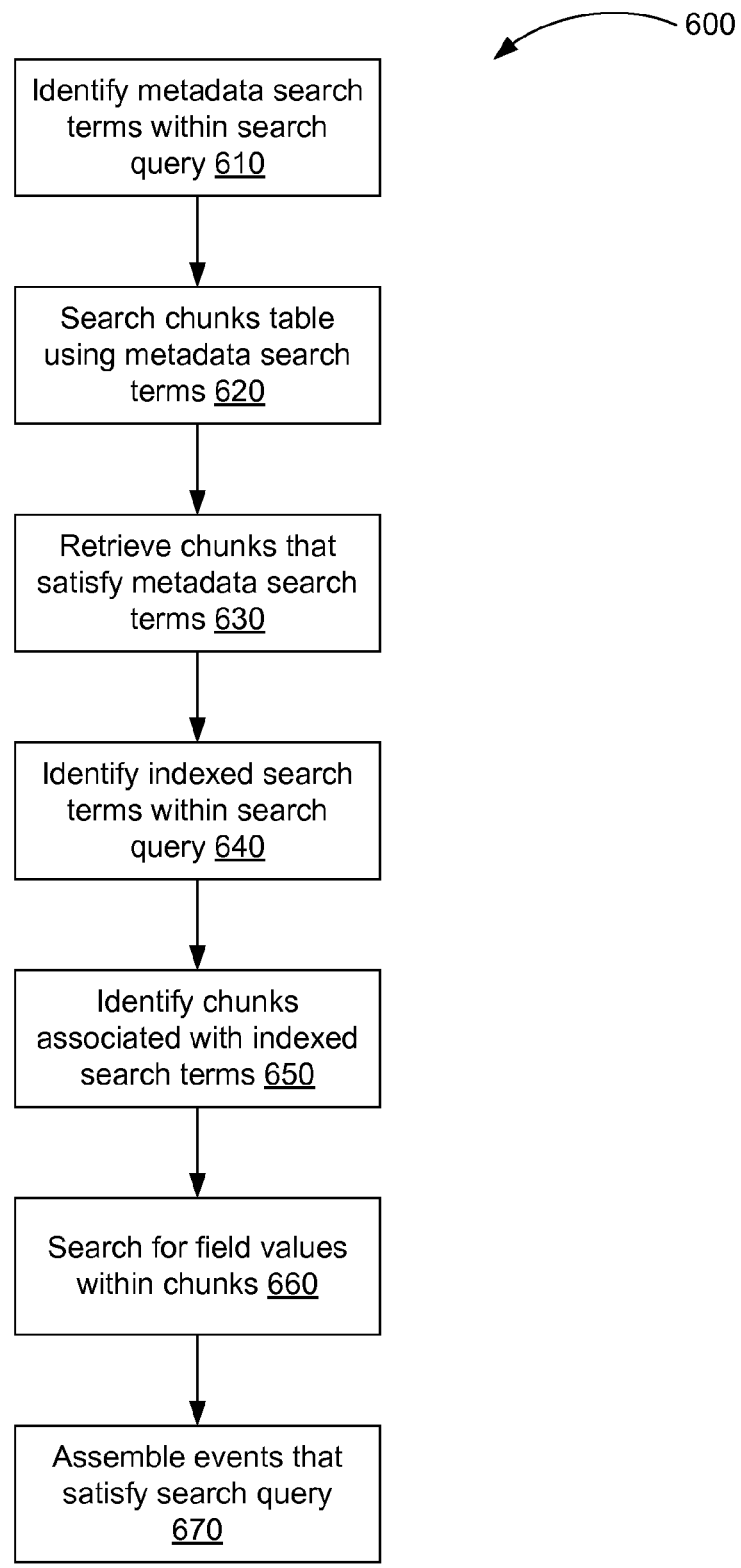
FIG. 6 is a flowchart illustrating a method for querying, according to one embodiment.

FIG. 6 is a flowchart illustrating a method for querying, according to one embodiment. In one embodiment, the method 600 of FIG. 6 is performed by the storage manager 320 (e.g., its control system 370). Before the method 600 begins, a search query is received. The search query includes one or more search terms.

Any metadata search terms (within the received search query) are identified 610.

The identified metadata search terms are used to search 620 the chunks table 380. Recall that each entry in the chunks table 380 corresponds to a chunk 350, and an entry includes the metadata stored in the chunk and the location of the chunk. The identified metadata search terms are used to search the metadata portion of the chunks table 380.

Each chunk 350 whose metadata satisfies the metadata search terms is retrieved 630 using the location of the chunk, which was stored in the chunks table 380.

Any indexed search terms (within the received search query) are identified 640.

Any chunks (from among those retrieved in step 630) associated with the indexed search terms are identified 650.

The identified indexed search terms are used to search 660 the payload portions of the chunks that were identified in step 640.

Events that satisfy the search query are assembled 670. When a field value entry within the payload portion of a chunk matches the search term, the entry's IndexLocationID is determined and used to access the field value entries of the remaining fields of the matching event.

8. Additional Embodiments—Archiving

In one embodiment, the logging system 170 supports archiving functionality for datafiles 385. For example, a datafile 385 can be imported into and exported out of the logging system 170. As another example, a datafile 385 can be backed up onto another system and later restored into the logging system 170. Since events are stored in chunks and chunks are stored in datafiles, events are easily transferable to nearline or offline storage. In one embodiment, a datafile is archived automatically based on archival criteria, which can be similar to the criteria that are used for querying (e.g., values of information stored in metadata structures of chunks within the datafile). In another embodiment, a datafile is archived manually (e.g., in response to a user command).

9. Row-Based Chunks in Combination with Column-Based Chunks

A. Storage

The '078 application describes storing event data using only row-based chunks. Above, the present application describes storing event data using only column-based chunks. A third type of event storage uses both row-based chunks and column-based chunks. This type of event storage stores an event twice—once using a row-based chunk and once using one or more column-based chunks. For example, a set of events would be stored as one row-based chunk. The field values of those events would also be stored as column-based chunks (one column-based chunk for each field).

Recall that row-based storage is write-optimized, while column-based storage is read-optimized. The advantage to storing an event using both row-based and column-based chunks is that both of these optimizations are available. The row-based chunk is faster to write, so using that architecture enables an event to be stored more quickly. The column-based chunk is faster to read, so using that architecture enables an event to be read (e.g., queried) more quickly.

In one embodiment, where both row-based chunks and column-based chunks are being used, the generation and storage of the row-based chunk and the generation and storage of the column-based chunks are not performed as part of the same transaction. If events are being received at a very high rate, then the generation and storage of column-based chunks ("indexing") can lag behind the generation and storage of row-based chunks. No data is dropped or delayed to the cost (e.g., time cost) of indexing. Note that even if the indexing is lagging behind the generation and storage of row-based chunks, the user can still query all of the event data using the row-based chunks.

Also, the row-based chunks and the column-based chunks can be associated with different retention policies. For example, a row-based chunk that stores a set of events can be associated with a first retention policy, and the column-based chunks that store the same set of events can be associated with a second retention policy (or multiple retention policies, as described above). As long as the row-based chunk exists, then the column-based chunks can be recreated if necessary. Likewise, as long as the column-based chunks exist, then the row-based chunk can be recreated if necessary. In general, less space is required to store a set of events in multiple column-based chunks than in one row-based chunk. So, in one embodiment, column-based chunks are stored longer than row-based chunks (e.g., for the same set of events).

If both row-based and column-based chunks are being used, that does not necessarily mean that all columns (fields) of the event must be stored in column-based chunks. Consider a set of events that is stored using a row-based chunk. Instead of storing all of the columns of the events as column-based chunks, only selected columns are stored in this way. Since column-based chunks are faster to query, perhaps only the most frequently queried columns are stored as column-based chunks. Note that even though the remaining columns are not stored as column-based chunks, their field values can still be queried by using the row-based chunk, since the row-based chunk includes all of the event data.

It follows that one way to optimize queries on events stored as row-based chunks is to create column-based chunks for the event fields that are queried most frequently. Creation of these column-based chunks can occur at any point in the event storage process. For example, the '078 application describes datafiles that store row-based chunks. The events can be extracted from the stored row-based chunks and then used to create one or more column-based chunks. (Note that a column of field values from multiple row-based chunks can be stored in one column-based chunk if desired.) Alternatively, when the storage manager first receives a chunk and loads the chunk into memory, the manager can create one or more column-based chunks. This way, the events don't have to be extracted from a stored row-based chunk and loaded into memory later. Another possibility is for the event receiver to create the column-based chunks, as described above. Or, the log data that is sent to the event receiver could already be in column-based format.

The four storage types described above (row-only, column-only, row-and-all-columns, and row-and-selected-columns) are not mutually exclusive. One logging system can use all four storage types. For example, a first set of events can be stored using a row-based chunk, a second set of events can be stored using column-based chunks, a third set of events can be stored using both row-based and column-based chunks (for all columns), and a fourth set of events can be stored using both row-based and column-based chunks (for selected columns). Which storage strategy is best depends on the circumstances. While row-based chunks are faster to create, column-based chunks are faster to query.

In one embodiment, the storage architecture is chosen based on when an event was received. For example, events that were received recently (such as within the past 30 days) are stored using both row-based and column-based chunks (for all columns). Older events are stored using only row-based chunks (or only column-based chunks). If the older events were previously stored using both row-based and column-based chunks (for all columns), then the row-based chunks and the column-based chunks contain the same information, so either can be deleted. If the older events were previously stored using both row-based and column-based chunks (for selected columns), then the row-based chunks and the column-based chunks do not contain the same information, and deleting the row-based chunks will cause information to be lost. In this situation, it might be better to delete the column-based chunks (since the information that they contain is redundant).

In another embodiment, the storage architecture is chosen based on the event receiver that received the event. For example, events that were received by a first receiver are stored using both row-based and column-based chunks. Events that were received by a second receiver are stored using only row-based chunks (or only column-based chunks).

In one embodiment, initialization of the logging system 170 includes specifying a storage strategy (e.g., row-only, column-only, row-and-all-columns, or row-and-selected-columns) and when that strategy should be used (e.g., based on event receipt time falling within a time period or based on event being received by a particular event receiver). In another embodiment, the storage strategy (and/or when the strategy should be used) can be changed at any time.

B. Querying/Data Retrieval

The '078 application describes querying and data retrieval for event data stored using only row-based chunks. In order to perform a query, data chunks are identified that could contain an event that satisfies the query. Specifically, search terms within the query are identified that contain information that was contained in the metadata structure. The "metadata search terms" are used to search the chunks table. In this way, a search can be constrained based on particular values for information that was stored in the metadata. The identified chunks are disassembled into their constituent events. Events that satisfy the query are identified.

Above, the present application describes querying and data retrieval for event data stored using only column-based chunks. In order to perform a query, data chunks are first filtered based on "field of interest" information (as stored in a chunk's metadata). The remaining chunks are then filtered based on field values (as stored in a chunk's "payload"). Finally, the events that satisfy the query are assembled field-by-field.

Recall that a column-based chunk includes a set of index location identifiers (IndexLocationIDs). The set of Index-LocationIDs includes one IndexLocationID for each field value in the chunk. The IndexLocationID is used to access a field value in a different chunk that corresponds to the same event. When only column-based chunks exist, the IndexLocationID is used to assemble events (field-by-field) that satisfy a search query.

When both row-based and column-based chunks exist, events that satisfy a search query do not need to be assembled field-by-field. Instead, the events can be obtained in their entirety from the corresponding row-based chunks. Specifically, a column-based chunk indirectly references its associated row-based chunk using a "table location identifier" (TableLocationID). In one embodiment, a set of table location identifiers (TableLocationIDs) is stored as its own column-based chunk. Each TableLocationID in the chunk corresponds to a particular event. The TableLocationID includes a row-based chunk identifier (RBChunkID) and a row-based chunk offset identifier (RBChunkOffsetID). The RBChunkID indicates which row-based chunk contains the event associated with the TableLocationID. The RBChunkOffsetID indicates where (within the row-based chunk) that event begins. Whenever a set of column-based chunks is generated (e.g., based on an existing row-based chunk or by an event receiver as described above with respect to step 440), a TableLocationID column-based chunk is also generated. Later, when a query is performed and a matching field value is found in one of these column-based chunks, the associated IndexLocationID (specifically, the OffsetID) is used to access the appropriate TableLocationID from the TableLocationID column-based chunk. In this way, a single query can use both row-based storage and column-based storage.

Three different query execution strategies have just been described—row-only, column-only, and row-and-column. A query optimizer determines which execution strategy should be used for a particular query. Specifically, the query optimizer calculates a "total cost" for each execution strategy and then selects the strategy with the lowest cost. (In one embodiment, the query optimizer considers only the column-only strategy and the row-and-column strategy, since the row-only strategy is likely to be the highest in cost.) The total cost of an execution strategy is a function of different sub-costs, such as the CPU cost and the input/output (I/O) cost. The sub-costs, in turn, are functions of the selectivity of the query's predicates and the number of columns (fields) involved in the query (both the predicates and the desired search results). The selectivity is estimated based on statistical information on fields of past events. For example, information on the data distribution on a field is provided by a histogram, which divides the values on a field into k buckets.

In general, the lower the selectivity, the more likely the query optimizer is to select the column-only strategy. The higher the selectivity, the more likely the query optimizer is to select the row-and-column strategy. Also, the lower the number of columns, the more likely the query optimizer is to select the column-only strategy. The higher the number of columns, the more likely the query optimizer is to select the row-and-column strategy.

A search query might not request all of the fields of events that satisfy the query. In this situation, the event can be obtained in its entirety as described above (using the TableLocationID and row-based chunk) and then unnecessary fields can be removed before generating the search results. If the search query requests many fields, then this approach might be faster than obtaining each field separately from a different column-based chunk.

Recall that searching a column-based chunk is faster than searching a row-based chunk. Consider a search query term that concerns a particular event field. If that field that is associated with an existing column-based chunk, then that column-based chunk is searched for the desired field value. If no such column-based chunk exists, then the appropriate row-based chunk is searched instead. Alternatively, the column-based chunk can be created (based on the row-based chunk) and then searched. Creating the column-based chunk might be preferable when the same field will need to be searched for several events.

C. Additional Embodiments

In one embodiment, where both row-based chunks and column-based chunks are being used, the column-based chunk generator ("indexer") supports checkpoint recovery. Specifically, in case of system crash, the indexer can recover and resume from the last checkpoint. The checkpoint interval is configurable. The longer the interval, the higher the performance of the indexer (e.g., the higher the speed with which column-based chunks are generated), but the longer the crash recovery time. During the checkpoint phase, the indexer persists the last-scanned TableLocationID and the last-created IndexLocationID. During the recovery phase, the indexer starts at the persisted TableLocationID and IndexLocationID and continues to index any remaining data in the table.

Archiving can be performed on row-based storage and/or on column-based storage. Archival criteria for automatic archiving can differ between the row-based storage and the column-based storage.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of processing events, wherein an event includes multiple fields, the method comprising:
   receiving a set of events;
   generating a row-based chunk that includes the set of events and metadata about the set of events, wherein the row-based chunk is associated with a first retention policy;
   generating a column-based chunk that includes metadata about the set of events and, for each event in the set of events, a value of a first field of the multiple fields, wherein the column-based chunk is associated with a second retention policy different from the first retention policy, and wherein the metadata about the set of events in the column-based chunk includes at least one of a minimum value or a maximum value of values of the first field over the events in the set of events;
   reclaiming storage used by a file containing the row-based chunk according to the first retention policy; and
   reclaiming storage used by a file containing the column-based chunk according to the second retention policy.

2. The method of claim 1, wherein the set of events is organized in a data structure including rows and columns, the rows corresponding to the events, and the columns corresponding to the fields, wherein the generating of the row-based chunk comprises including a row of the data structure in the row-based chunk, and wherein the generating of the column-based chunk comprises including a column of the data structure in the column-based chunk.

3. The method of claim 2, wherein the column-based chunk includes just one column of the columns of the data structure.

4. The method of claim 2, further comprising generating a second column-based chunk that includes metadata about the set of events and another column of the data structure.

5. The method of claim 1, wherein the metadata in the column-based chunk comprises both the minimum value and the maximum value of the values of the first field over the events in the set of events.

6. The method of claim 1, wherein the metadata in the column-based chunk comprises a compressed version of content in the set of events.

7. The method of claim 1, further comprising:
   receiving a query containing a search term; and
   identifying at least one of the row-based chunk and the column-based chunk as being responsive to the search term.

8. A non-transitory machine-readable storage medium storing instructions that upon execution cause a system to:
   receive a first set of events, each event of the first set of events including multiple fields;
   generate a row-based chunk that includes the first set of events and metadata about the first set of events, wherein the metadata about the first set of events includes at least one of a minimum value or maximum value of values of a first field over the events in the first set of events, and wherein the row-based chunk is associated with a first retention policy;
   receive a second set of events, each event of the second set of events including the multiple fields;
   generate a first column-based chunk that includes metadata about the second set of events and, for each event in the second set of events, a value of a second field of the multiple fields, wherein the metadata about the second set of events includes at least one of a minimum value or maximum value of values of the second field over the events in the second set of events, wherein the column-based chunk is associated with a second retention policy different from the first retention policy;
   reclaim storage used by a file containing the row-based chunk according to the first retention policy; and
   reclaim storage used by a file containing the first column-based chunk according to the second retention policy.

9. The non-transitory machine-readable storage medium of claim 8, wherein the instructions upon execution cause the system to further generate a second column-based chunk that includes metadata about the second set of events and, for each event in the second set of events, a value of a third field of the multiple fields.

10. The non-transitory machine-readable storage medium of claim 9, wherein the first column-based chunk includes values of the second field but not values of other fields of the multiple fields, and wherein the second column-based chunk includes values of the third field but not values of other fields of the multiple fields.

11. The non-transitory machine-readable storage medium of claim 8, wherein the metadata in the row-based chunk comprises a compressed version of content in the first set of events, and the metadata in the first column-based chunk comprises a compressed version of content in the second set of events.

12. The non-transitory machine-readable storage medium of claim 8, wherein the instructions upon execution cause the system to further:
   receive a query containing a search term; and
   identify at least one of the row-based chunk and the first column-based chunk as being responsive to the search term.

13. A system comprising:
   at least one processor; and
   a non-transitory storage medium storing instructions executable on the at least one processor to:
      receive a query comprising a search term;
      access a first column-based chunk that includes, for each event in a set of events, a value of a first field of multiple fields;
      identify a value in the first column-based chunk that matches the search term;
      identify an index location identifier associated with the identified value;
      access a second column-based chunk that includes, for each event in the set of events, a table location identifier, wherein the first column-based chunk includes values of the first field but not values of other fields of the multiple fields, and wherein the second column-based chunk includes values of a second field but not values of other fields of the multiple fields;
      identify the table location identifier in the second column-based chunk that is associated with the identified index location identifier;
      access a row-based chunk that includes each event in the set of events; and
      identify an event in the row-based chunk that is associated with the identified table location identifier.

14. The system of claim 13, wherein the set of events are arranged in a data structure comprising rows and columns, wherein the row-based chunk includes the rows of the data structure, the first column-based chunk includes a first column of the data structure, and the second column-based chunk includes a second column of the data structure.

15. The system of claim 13, wherein the row-based chunk is associated with a first retention policy, and the first column-based chunk is associated with a second, different retention policy, and the instructions are executable on the at least one processor to:
   reclaim storage used by a file containing the row-based chunk according to the first retention policy; and
   reclaim storage used by a file containing the first column-based chunk according to the second retention policy.

* * * * *